United States Patent [19]

Yamasaki

[11] Patent Number: 5,028,948
[45] Date of Patent: Jul. 2, 1991

[54] PHOTOELECTRIC TRANSDUCER APPARATUS FOR FOCUS DETECTION

[75] Inventor: Masafumi Yamasaki, Hachioji, Japan

[73] Assignee: Olympus Optical Company Ltd., Japan

[21] Appl. No.: 501,309

[22] Filed: Mar. 26, 1990

Related U.S. Application Data

[63] Continuation of Ser. No. 130,682, Dec. 9, 1987, abandoned.

[30] Foreign Application Priority Data

Dec. 27, 1986 [JP] Japan ............................ 61-309937
Sep. 8, 1987 [JP] Japan ............................ 62-225670

[51] Int. Cl.⁵ .................... G03B 13/36; G02B 7/28; H04N 5/335
[52] U.S. Cl. ............................ 354/402; 250/201.2; 358/213.19
[58] Field of Search ....................... 354/402–409; 250/201.2, 578.1; 358/213.19, 213.23, 213.27, 213.26

[56] References Cited

U.S. PATENT DOCUMENTS

| | | | |
|---|---|---|---|
| 4,334,151 | 6/1982 | Herbst et al. | 354/402 X |
| 4,411,505 | 10/1983 | Sakai et al. | 354/402 |
| 4,523,101 | 6/1985 | Tsunekawa | 250/201 PF X |
| 4,618,235 | 10/1986 | Ishida et al. | 354/403 |
| 4,623,927 | 11/1986 | Hoshino | 358/213.19 |
| 4,636,624 | 1/1987 | Ishida et al. | 354/406 X |
| 4,677,306 | 6/1987 | Yamano | 250/578 |
| 4,701,626 | 10/1987 | Ishizaki et al. | 250/578 |
| 4,870,441 | 9/1981 | Yamasaki | 354/402 |

FOREIGN PATENT DOCUMENTS 154880 11/1981 Japan .

Primary Examiner—W. B. Perkey
Attorney, Agent, or Firm—Louis Weinstein

[57] ABSTRACT

A photoelectric transducer apparatus detects whether a charge storing period of a photodiode array in a CCD image sensor is more or less than a given period by means of a monitor circuit and controls a charge storing period by switching a charge storage capacity of the photodiode array in response to an output of the monitor circuit so as to increase when an object being photographed is bright, for example, and hence the charge storing period is less than the given value.

25 Claims, 10 Drawing Sheets

PHOTOELECTRIC TRANSDUCER APPARATUS FOR FOCUS DETECTION

This is a continuation of application Ser. No. 130,682, filed Dec. 9, 1987, now abandoned.

BACKGROUND OF THE INVENTION

The present invention relates to a photoelectric transducer apparatus for focus detection, and more particularly, to a photoelectric transducer apparatus which is capable of detecting a focussed condition even when brightness varies widely in a focus detector apparatus which detects a distance to an object being photographed in accordance with an amount of electric charge delivered by a self-scanning image sensor such as a CCD.

Recently, various improvements have been made in the field of focus detector apparatus and a required detectable range of brightness has been also extended. In particular, it is hoped to further widen a photometric range in the low brightness region. A method for obtaining a constant output over a wide range from a low to a high brightness is shown in Japanese Laid-Open Patent Application Sho 56/1981-154,880, for example, which monitors a change in potential of a storage electrode for storing a signal charge and transfers the signal charge to a transfer line when the potential reaches a given level. Another method is shown in Japanese Laid-Open Patent Application Sho 57/1982-64,711 in which a light detector for monitoring is disposed adjacent to an array of photoelectric transducers to control a time period for storing charge in a self-scanning photoelectric transducer portion in response to an amount of the stored charge in the light detector in accordance with the amount of incident light rays. Further method is shown in Japanese Laid-Open Patent Application Sho60/1085-121,409 in which a reset pulse generator is provided for resetting a transfer clock pulse generator in response to an output for decision when an output from a monitor circuit becomes lower than a given level and a shift pulse generator is connected to the reset pulse generator so as to produce a shift pulse in response to a reset pulse to respond to a wider range of brightness.

Of the above prior art examples, the disclosure of Japanese Laid-Open Patent Application Sho60/1985-121,409 eliminates an error caused by synchronizing a signal charge with a transfer clock pulse, especially an error in an integrating period in a high brightness. In this point, the Japanese Laid-Open patent application Sho60/1985-121,409 is more improved than the other Japanese Laid-Open patent applications Sho56/1981-154,880 and Sho57/1982-64,711. In the Japanese Laid-Open Patent Application Sho60/1985-121,409, however, it takes several tens of μs until a signal charge is transferred to a transfer line after completion of an integration period has been detected and such time can not be accelerated any more. Consequently, there is a problem that a detectable range in a high brightness condition becomes narrow because an integration period in a high brightness becomes too small when a detectable sensitivity in a low brightness is raised.

SUMMARY OF THE INVENTION

It is an object of the present invention to provide a photoelectric transducer apparatus which is capable of detecting a focus over a wide range of brightness without reducing the storing period of a signal charge in a high brightness even when a detectable range is extended by raising a detectable sensitivity in a low brightness. According to the present invention, a charge storage capacity in a high brightness is made large to increase a charge storing period, so that it is possible to reduce an error in integration period due to a delay in response time required for transferring charge to a transfer line after completion of storing charge and thus to detect a focus over a wide range from a low to a high brightness.

DETAILED DESCRIPTION OF PREFERRED EMBODIMENTS

Figure 1:
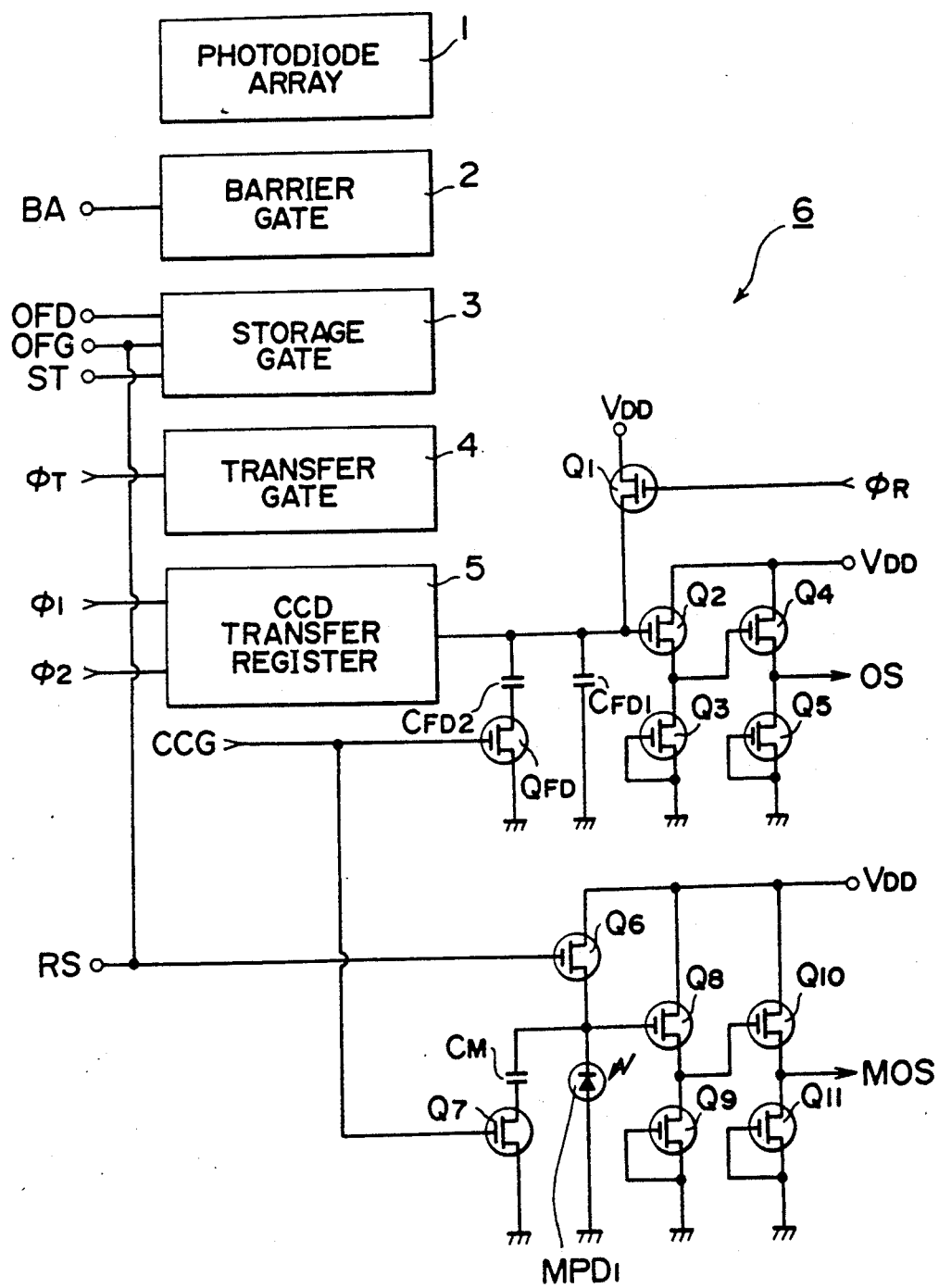
FIG. 1 is an electric circuit diagram of a CCD image sensor in a photoelectric transducer apparatus for focus detection illustrating a first embodiment of the present invention.

FIGS. 1 to 6 show a first embodiment of the present invention. In FIG. 1 showing a circuit structure of a CCD image senser 6, when light rays impinge upon an array of photodiodes 1 composed of a plurality of photoelectric transducers, charges generated in the photodiode array 1 are stored in a storage device under a storage gate 3 over a potential of a barrier gate 2. When the charge in the storage gate reaches a given value, it is transferred to a CCD transfer register 5 by applying a transfer gate pulse $\phi T$ to a transfer gate 4. The charge transferred to the CCD transfer register 5 is succesively delivered by transfer clock pulses $\phi 1$ and $\phi 2$. In FIG. 1, BA is a terminal for applying a control signal to the barrier gate 2, OFD is a terminal for applying a control signal to an overflow drain under the storage gate 3, OFG is a terminal for applying a control signal to an overflow gate and ST is a terminal for applying a control signal to the storage gate 3. When a positive voltage is applied to the terminal OFG, all the charge stored in the storage flows into the overflow drain.

The OFG terminal is connected to a reset terminal RS which will be described later. When a reset signal RS of a high level (hereinafter referred to as "H") is applied to the overflow gate immediately before initiation of storing charge, all the charge in the storage is discharged and the storage is set to its initial condition.

Capacitors $C_{FD1}$ and $C_{FD2}$ whose first ends are connected to an output terminal of the CCD transfer register 5 have a capacity equivalent to floating diffusion. The transferred charge is stored in the capacitors $C_{FD1}$ and $C_{FD2}$, is amplified by a two stage amplifier circuit of a source follower comprising FETs (field effect transistor) $Q_2$ to $Q_5$ and is read out as a signal output OS. The other (second) end of the capacitor $C_{FD1}$ is grounded and the other second end of the capacitor $C_{FD2}$ is grounded through an FET $Q_{FD}$. The gate of the FET $Q_{FD}$ is controlled by a storage capacity switching signal CCG which is fed from a CPU 9 (see FIG. 2). An FET $Q_1$ is provided to periodically reset the floating diffusion whenever charge for one picture element is transferred to the output terminal of the CCD transfer registor 5 and is reset by inputting a signal $\phi R$ from a CCD driver 7 (see FIG. 2) to the gate thereof. A circuit comprising FETs $Q_6$ to $Q_{11}$, a capacitor $C_M$ and a photoelectric transducer $MPD_1$ for monitoring is provided to control a charge storing period in the charge storage by monitoring an amount of light rays incident upon the photodiode array 1. The transducer $MPD_1$ is disposed adjacent to the photodiode array 1 and is connected in parallel to a series circuit comprised of the capacitor $C_M$ and the FET $Q_7$. The gate of the FET $Q_7$ is controlled in synchronism with a storage capacity switching signal CCG. The signal CCG, as will be described later, is a signal for switching a capacity which stores signal charge in accordance with a brightness of an object being photographed and is controlled by the CPU9. A junction capacity of the transducer $MPD_1$ when reversely biased is charged through the FET $Q_6$ to a power source voltage $V_{DD}$ while the $MPD_1$ is reset. The gate of the FET $Q_6$ is connected to the terminal OFG in common with the RS terminal and is controlled by a reset signal RS from the CPU 9. An output voltage of the transducer $MPD_1$ is amplified by a two stage amplifier circuit of a source follower comprising FETs $Q_8$ to $Q_{11}$.

Figure 2:
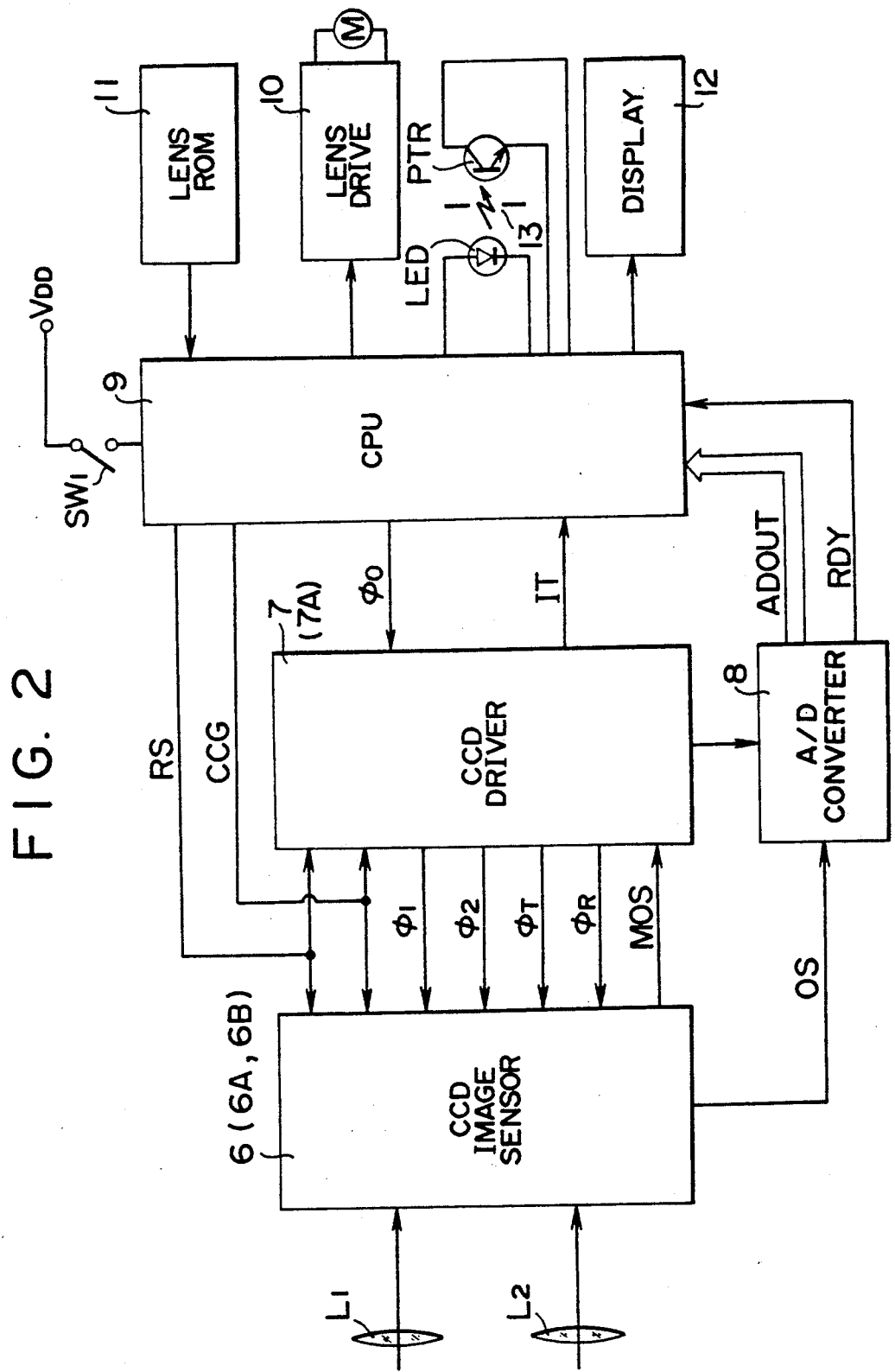
FIG. 2 is a block diagram of a focus detector apparatus employing the first embodiment shown in FIG. 1.

FIG. 2 is a block diagram of a focus detector apparatus which detects a focussed condition of a camera by driving the CCD image sensor 6 shown in FIG. 1. Common signals in FIG. 2 to those in FIG. 1 are given the same reference characters.

Light rays required for focus detection and passing through a pair of lenses $L_1$ and $L_2$ impinge upon a CCD image sensor 6. On the other hand, when a start switch $SW_1$ is closed the CPU 9 is actuated to supply a reset signal RS from the CPU9 to the CCD image sensor 6 and the CCD driver 7. The CCD image sensor 6 receives a storage capacity switching signal CCG from the CPU9 and transfer clock pulses $\phi 1$ and $\phi 2$, a transfer gate pulse $\phi T$ and a pulse $\phi R$ for periodically resetting floating diffusion from the CCD driver 7. The CCD image sensor 6 delivers a monitor output MOS and a signal output OS to the CCD driver 7 and an A/D converter 8, respectively. The A/D converter 8 effects an A/D conversion of a signal output OS in response to a timing signal from the CCD driver 7. The result of the A/D conversion is introduced into the CPU9 as an ADOUT signal after an A/D conversion completion signal RDY has been detected by the CPU 9. In addition, the CPU9 delivers a reference clock pulse $\phi 0$ for preparing the signals $\phi 1$, $\phi 2$, $\phi T$, $\phi R$ and the like to the CCD driver 7. The CCD driver 7 delivers a signal output IT which generates a pulse in proportion to a charge storing period to the CPU9.

A lens drive circuit 10 rotates a motor M in accordance with object range information which is determined by the CPU9 to drive a taking lens. A lens ROM11 is a read only memory built in a lens barrel for storing data required for focus detection such as an F number of a lens and conversion coefficients for obtaining a defocus from deviation of an image. A display device 12 displays either an in-focus or an out-of-focus condition. It is normally required to detect an object range and to feed back an amount of movement of a taking lens to the CPU9 when the lens is driven based on the detected object range. The number of rotations of a lens drive motor M is generally used for an amount of the lens movement. To this end, a light emitting diode (LED) and a phototransistor (PTR) are provided. Specifically, when the lens drive circuit 10 operates to rotate the motor M, slits 13 equidistantly disposed on a rotating member of the lens barrel rotates to count the number of slits 13 by a photointerrupter in which the LED and the PTR for detecting the number of rotations are disposed facing each other with the passage of the slits between. The CPU 9 stores the number of slits 13 counted by detector PTR to stop the motor M when the number reaches a given value.

Figure 3:
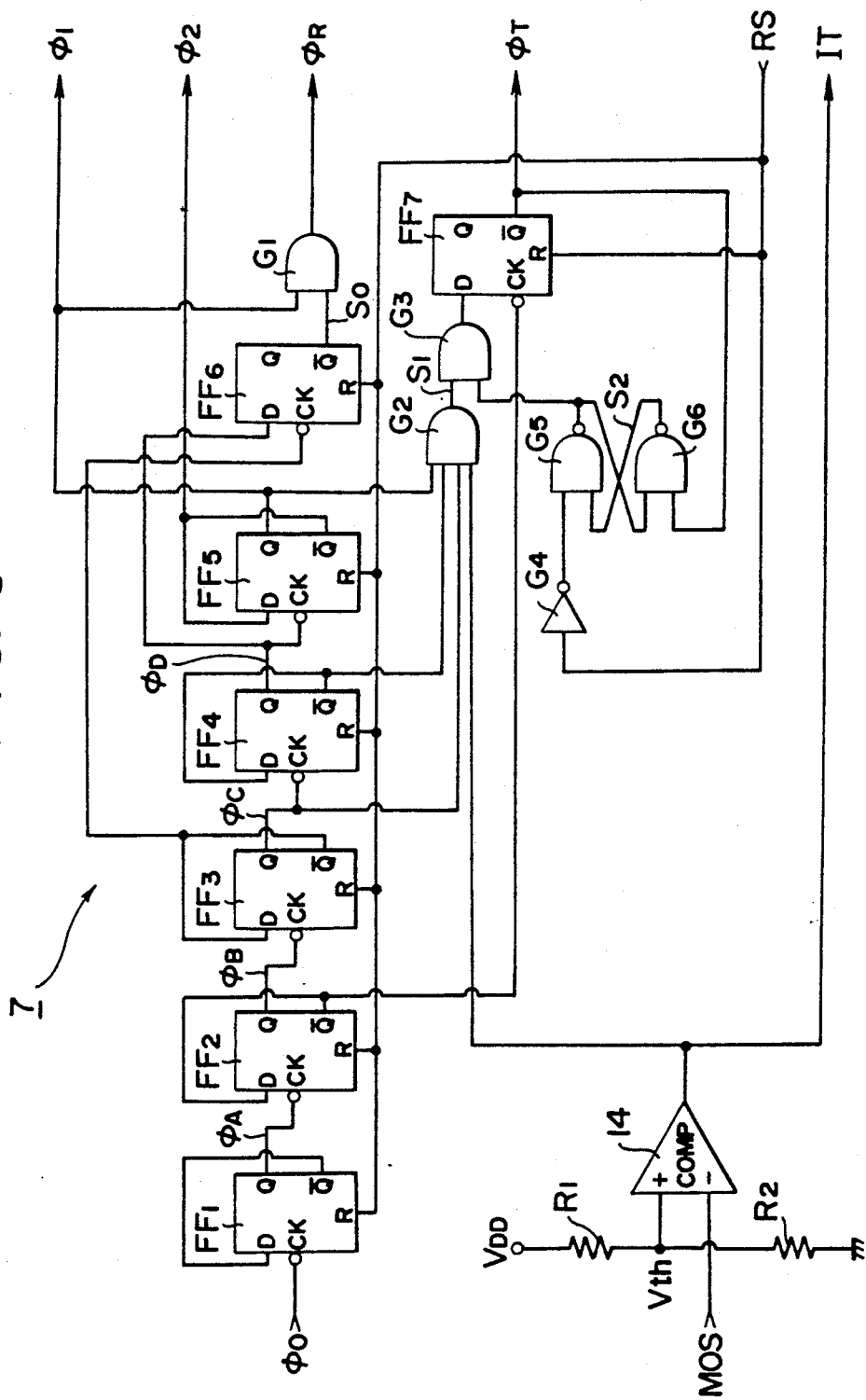
FIG. 3 is an electric circuit diagram of a CCD driver which is used in the focus detector apparatus shown in FIG. 2.

In FIG. 3, which is a circuit diagram of the CCD driver 7, flip-flop circuits FF1 to FF7 are of the D type. The flip-flops FF1 to FF5 successively divide a frequency of reference clock pulse $\phi 0$ from the CPU9 to deliver transfer clock pulses $\phi 1$ and $\phi 2$ of the CCD transfer register 5 (FIG. 1). An AND gate G1 receives the transfer clock pulse $\phi 1$ and a signal $S_0$ delivered from an inverting output terminal $\overline{Q}$ of the D type flip-flop FF6 to deliver a pulse $\phi R$ for periodically resetting the floating diffusion to apply it to the CCD image sensor 6. On the other hand, a monitor output MOS from the CCD image sensor 6 is compared with a reference voltage $V_{th}$, which is obtained by dividing a power source voltage $V_{DD}$ by resistors $R_1$ and $R_2$, in a comparator 14. A signal IT of a low level (hereinafter referred to as "L") while the output MOS exceeds the reference voltage Vth, is supplied to the CPU9. A signal at an inverting output terminal $\overline{Q}$ of the FF7 is delivered to the R-S type flip-flop circuit comprising NAND gates G5 and G6. An output from the R-S type flip-flop circuit is delivered through an AND gate $G_3$ to an input terminal D of the $FF_7$ to form a feedback loop, so that the $FF_7$, after being activated once, is not reactivated until a reset signal RS is applied through an inverter $G_4$ to the NAND gate G5. Consequently, a transfer gate pulse $\phi T$ is not delivered repeatedly. A reset signal RS delivered by the CPU 9, which is normally at "L", becomes "H" when reset to set the R-S type flip-flop circuit comprising the flip-flops FF1 to FF7 and the NAND gates $G_5$ and $G_6$ to its initial condition.

Figure 6:
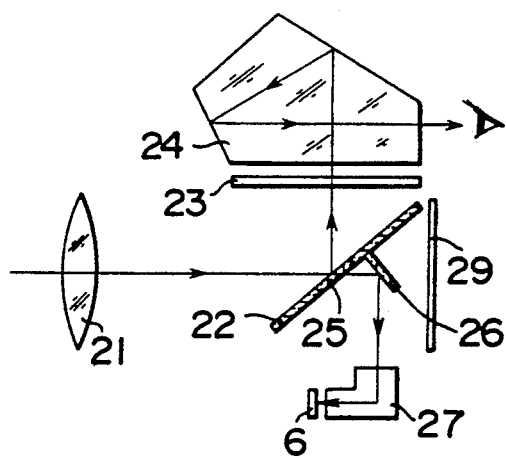
FIG. 6 is a structural diagram showing an optical system for focus detection of a camera to which the first embodiment is applied.

In FIG. 6, which is a schematic diagram of an optical system for focus detection, light rays transmitted through a taking lens 21 are reflected by a quick-return mirror 22 to be guided to a finder optical system comprising a screen 23 and a pentagonal prism 24. On the other hand, part of the light rays transmitted through a half mirror 25 which is placed at the center of the mirror 22 are reflected by an auxiliary mirror 26 and guided by a range measuring optical system 27 to be received by the CCD image sensor 6. Reference numeral 29 denotes a film surface.

Operations of the first embodiment with the above mentioned structure will be described with reference to timing charts shown in FIGS. 4 and 5. Mainly, a timing chart shown in FIG. 4 shows signals shown in FIG. 2 and a timing chart shown in FIG. 5 shows signals shown in FIG. 3.

Figure 4:
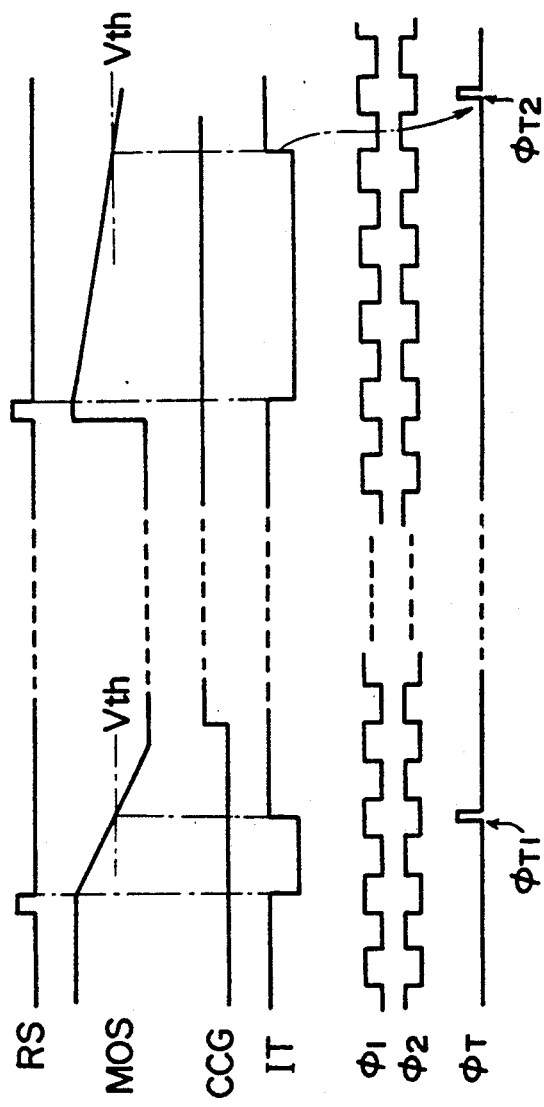
FIGS. 4 and 5 are timing charts for explaining operations of signals in the first embodiment.
Figure 5:
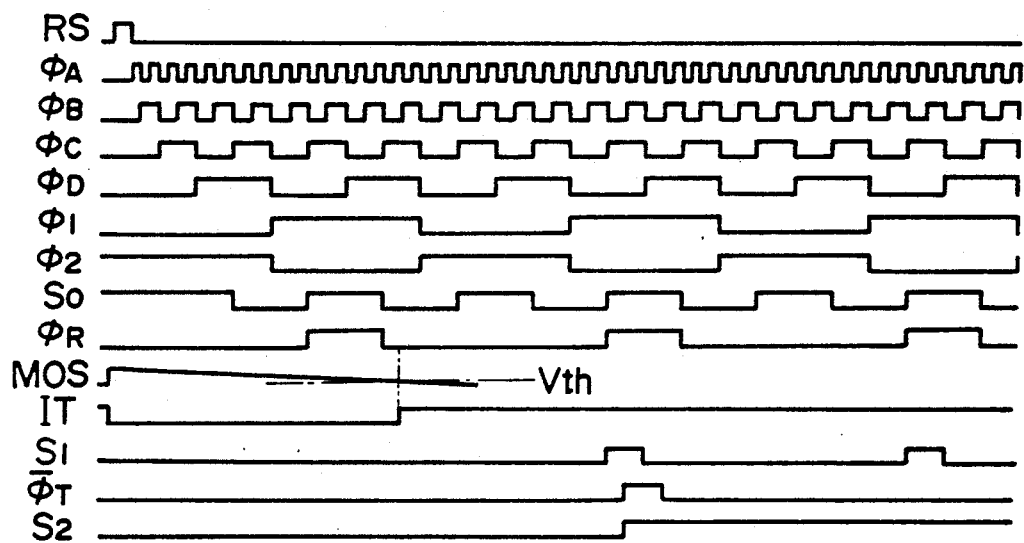

As shown in FIGS. 4 and 5, when the start switch $SW_1$ connected to the CPU 9 turns on, the CPU9 delivers a pulse of "H" as a reset signal RS to the CCD image sensor 6 and the CCD driver 7 and a signal of "L" level as a storage capacity switching signal CCG to the CCD image sensor 6. When the reset signal RS first becomes "H", the monitor photoelectric transducer $MPD_1$ is reset to its initial condition. Accordingly, the FET $Q_6$ turns on to charge a reverse direction junction capacity of the $MPD_1$ to the power source voltage VDD. When the reset signal RS returns to "H", the FET $Q_6$ turns off to reduce the stored charge of the $MPD_1$ in accordance with an amount of incident light rays, so that an output MOS of the monitor circuit gradually falls in potential at a rate corresponding to a brightness of an object being photographed. When the monitor output MOS reaches predetermined potential $V_{th}$, an output signal IT of the comparator 14 returns to "H", so that the $FF_7$ is set when the AND gate $G_2$ achieves the logical and operation. Thereupon, a transfer gate pulse $\phi T$ is delivered from the inverting output terminal $\overline{Q}$ of the $FF_7$ to transfer the stored charge to the transfer line.

Since the transfer gate pulses $\phi T$ are generated in synchronism with "H" of transfer clock pulses $\phi 1$, there are cases where, as shown in FIG. 4, a pulse $\phi T1$ is substantially in synchronism with a rising edge of a signal IT and a pulse $\phi T2$ is about one period behind. The potential $V_{th}$ is set such that a stored charge by the photodiode array 1 is about 50% of a saturation voltage.

An output signal IT of the comparator 14 is at "L" for a charge storing period until a monitor output MOS reaches the potential $V_{th}$ which signal is to be delivered to the CPU9. THE CPU9 monitors a period at "L" of the signal IT. When the "L" period is smaller than a predetermined value, that is, an object being photographed is bright, a storage capacity switching signal CCG is changed from "L" to "H". Consequently, the FET QFD and the FET $Q_7$ are turned on to connect the capacitors $CFD_2$ and $C_M$ to the capacitors $CFD_1$ and reverse direction junction capacity in parallel, respectively, to increase the storage capacity.

After the signal CCG has become "H", as shown in FIG. 4, when a reset signal RS becomes "H" again in the CPU9, all the charge in the storage under the storage gate 3 shown in FIG. 1 is discharged to the overflow drain and the $MPD_1$ and the capacitor $C_M$ connected to the latter in parallel (FIG. 1) are charged to the power source voltage $V_{DD}$ to be set to their initial conditions. Upon the completion of setting the initial conditions, a monitor output MOS reduces its potential at a rate corresponding to an amount of light rays incident upon the photodiode array 1. At this time, since the capacitor $C_M$ is connected in parallel to the transducer $MPD_1$, a rate of change in potential of the output MOS becomes slower than before and it takes a long time to reach the potential $V_{th}$. Consequently, it is possible to obtain a sufficiently longer storing period than a delay in response of the circuit. Namely, this is to cope with the situation of a sufficiently bright object being photographed.

On the other hand, while the longer the storing period is, the more charge is produced by the photodiode array 1, a signal output OS is retained at a constant voltage since a capacity of the floating diffusion is increased from $CFD_1$ to ($CFD_1 30\ CFD_2$).

Figure 7:
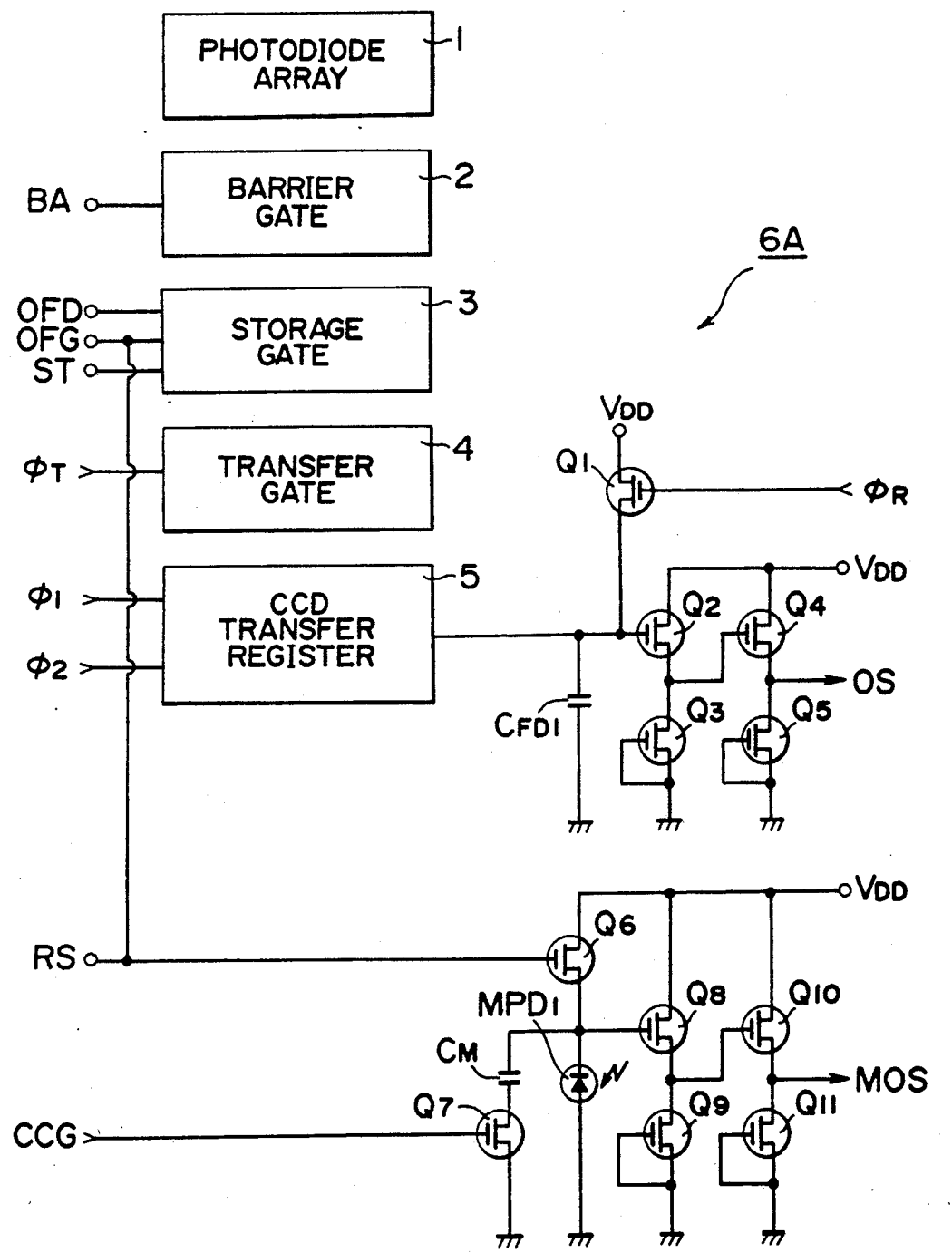
FIG. 7 is an electric circuit diagram of a CCD image sensor in a second embodiment of the present invention.

A second embodiment of the present invention will be described hereinafter with reference to FIGS. 7 to 9. A CCD image sensor 6A shown in FIG. 7 is the one that the capacitor $CFD_2$ of the floating diffusion and the FET QFD connected in series to the latter are removed from the CCD image sensor 6A in FIG. 1. In FIG. 7, other structures are the same as those in FIG. 1.

Figure 8:
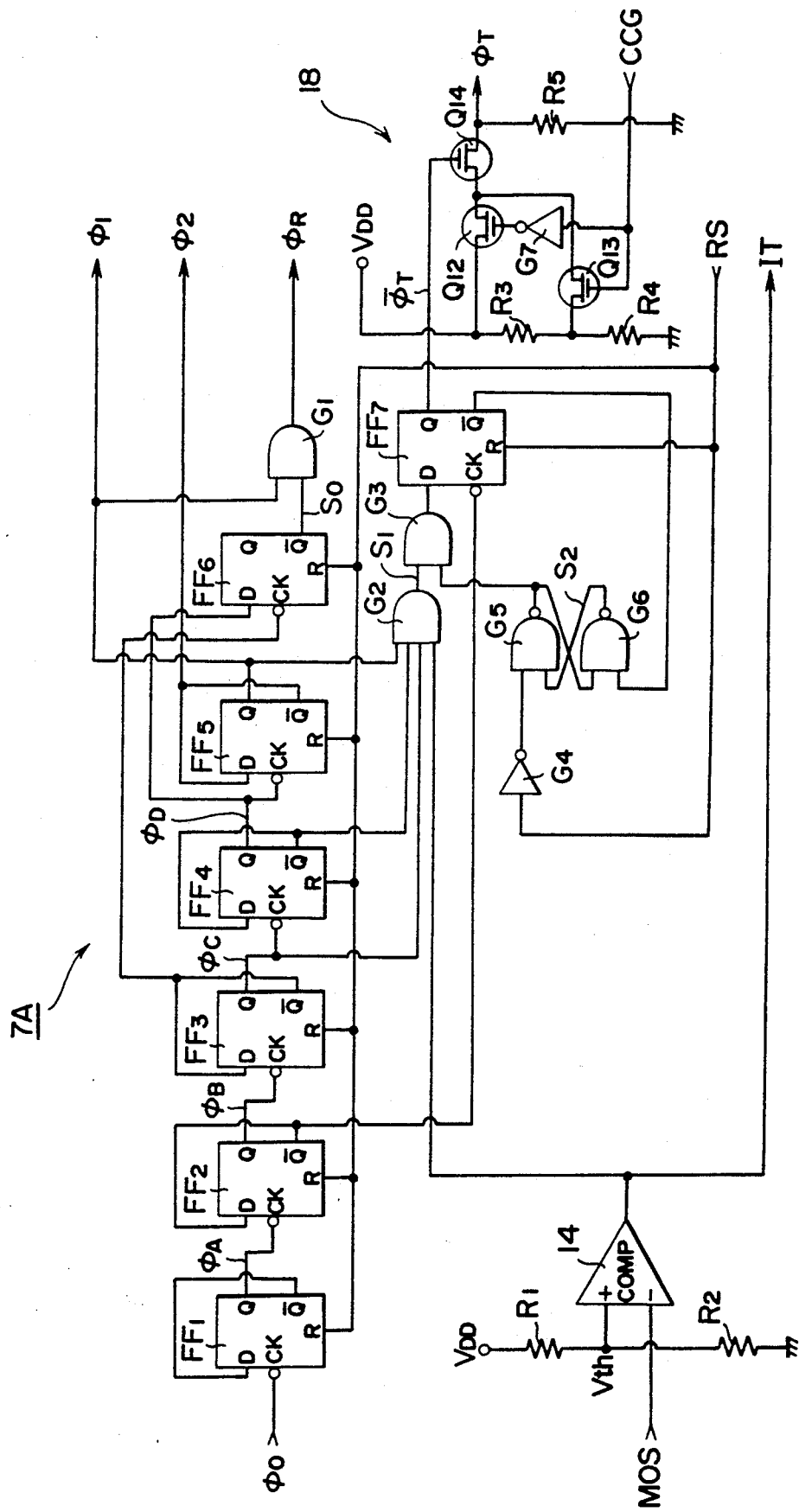
FIG. 8 is an electric circuit diagram of a CCD driver used in the second embodiment shown in FIG. 7.
Figure 9:
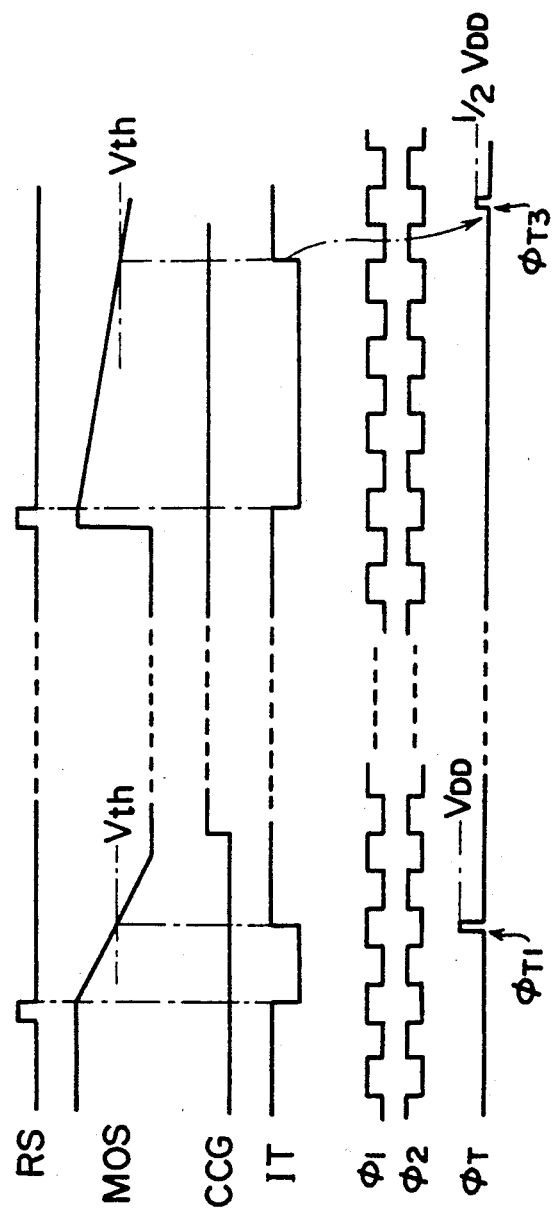
FIG. 9 is a timing chart for explaining operations of signals in the second embodiment.

A CCD driver 7A shown in FIG. 8 has substantially the same structure as the CCD driver 7 shown in FIG. 3. Only different parts of the CCD driver 7A from the CCD driver 7 will be described hereinafter.

In FIG. 8, a transfer gate control circuit 18 comprising FETs $Q_{12}$, $Q_{13}$ and $Q_{14}$, inverter $G_7$ and resistors $R_3$ to $R_5$ is provided to change a level of a transfer gate pulse $\phi T$ to the CCD transfer register 5. When a storage capacity switching signal CCG from the CPU9 is at "L" and a D type flip-flop circuit $FF_7$ is set, a transfer gate pulse $\phi T$ to be delivered has an amplitude equal to that of the power source voltage $V_{DD}$ (a pulse $\phi T_1$ shown in FIG. 9). When the signal CCG is at "H", a transfer gate pulse T has an amplitude equal to that of a voltage dividing the power source voltage $V_{DD}$ by resistors $R_3$ and $R_4$. Now, assuming $R_3 = R_4$, the pulse T has a half voltage of the power source voltage $V_{DD}$ (a pulse $\phi T3$ shown in FIG. 9). In the second embodiment with such a structure, when a start switch $SW_1$ turns on, the CPU9 delivers a reset signal RS of "H" and a storage capacity switching signal CCG of "L" to the CCD image sensor 6A and the CCD driver 7A, respectively, with a timing shown in FIG. 9, in the same manner as in FIG. 4, to initiate operations in a manner similar to the foregoing. When an object being photographed is bright and the signal CCG changes from "L" to "H", the FET $Q_7$ turns on, so that the capacitor $C_M$ is connected in parallel to the reverse direction junction capacitor of the monitor photoelectric transducer $MPD_1$ to increase a storage capacity. Consequently, the capacitor $C_M$ and the transducer $MPD_1$ are then charged to the power source voltage $V_{DD}$ by changing reset signal RS to "H" and thus the initial condition is set. Upon completion of setting the initial condition, a potential of a monitor output MOS falls in accordance with an amount of light rays incident upon a photodiode array 1. Now, since the charge storage capacity is increased, a time required for a monitor output MOS to reach the potential $V_{th}$ becomes longer, resulting in that it is possible to obtain a sufficiently long charge storing period compared with a delay in response of the circuit, in the same manner as in the first embodiment.

The longer the storing period, the more the stored charge. In the second embodiment, unlike the first embodiment, a capacitance of an output terminal of the CCD transfer register 5 is unchangeable with $CFD_1$. Consequently, when charge is successively taken out by shifting the charge in the storage to the transfer line by a transfer gate pulse $\phi T$ of the same potential as the last, a potential of the floating diffusion becomes too high, so that there is caused such disadvantages that linearity of a signal output OS is lost and a proper A/D conversion is impracticable because an input range of the A/D converter 8 is too great. For this reason, in the second embodiment, when the charge storing period is made longer, such disadvantages are prevented by setting a threshold potential of a signal which is transferred to the CCD transfer line, to a high value by lowering the level of a transfer gate pulse $\phi T$ like a pulse $\phi T3$.

When an object being photographed is brighter than a given level and hence a storage capacity switching signal CCG is switched from "L" to "H" as described above in order to make the charge storing period longer, an FET $Q_{13}$ of the CCD driver 6A turns on and an FET $Q_{12}$ turns off. As a result, when a gate signal $\phi T$ to an FET $Q_{14}$ which is delivered from an output terminal Q of a D type flip-flop circuit $FF_7$ is at "H", a transfer gate pulse $\phi T$ which is an output of the $Q_{14}$ has such a low voltage that the power source voltage $V_{DD}$ is divided by resistors $R_3$ and $R_4$. The transfer gate pulse $\phi T$ at this time is shown in FIG. 9 as a pulse $\phi T3$. Consequently, a threshold potential of a signal transferred to the transfer line of the CCD transfer register 5 is set to a high value compared with that at a time when a storage capacity switching signal CCG is at "L". As a result, even when the charge storing period varies, an amount of charge transferred to the transfer line is substantially equalized, so that the above-mentioned disadvantages are avoided.

Figure 10:
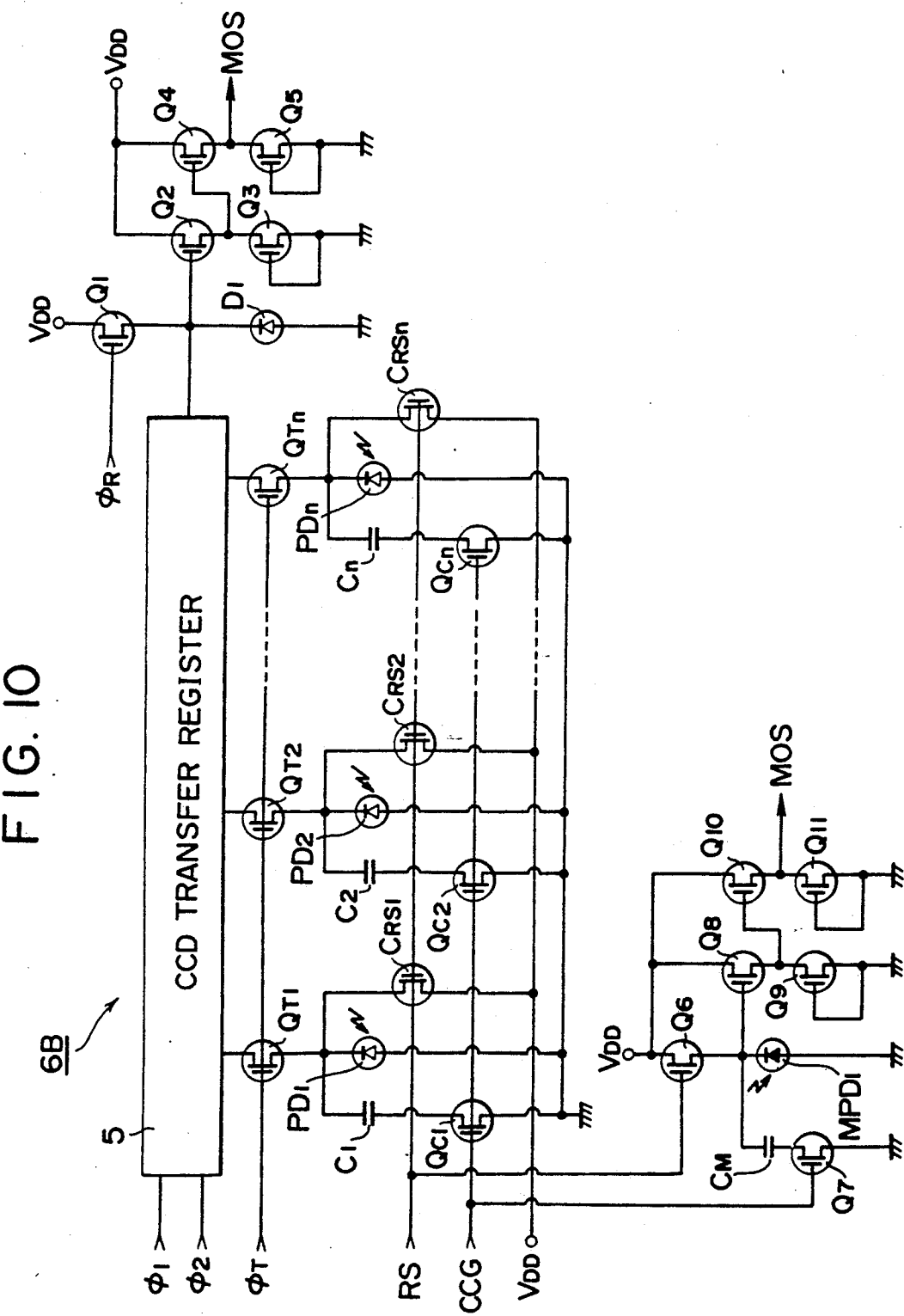
FIG. 10 is an electric circuit diagram of a CCD image sensor in a third embodiment of the present invention.

In FIG. 10, which shows a CCD image sensor 6B in a third embodiment of the present invention, charge storage type photoelectric transducers $PD_1$ to $PD_n$ which are arranged in line are connected to a CCD transfer register 5 as a photodiode array. After photocharges of the transducers $PD_1$ to $PD_n$ are delivered through FETs $QT_1$ to $QT_n$ forming a transfer gate which are controlled by a transfer gate pulse $\phi T$ to the CCD transfer register 5, the photocharges are successively transferred from the CCD transfer register 5 in response to transfer clock pulses $\phi 1$ and $\phi 2$ of two phases which are supplied by the CCD driver 7A(FIG. 8). The transferred output are amplified by a two-stage amplifier of a source follower comprising FETS $Q_2$ to $Q_5$ in the same manner as in the foregoing embodiments to be delivered to the A/D converter 8 (FIG. 2) as a signal output OS. The photoelectric transducers $PD_1$ to $PD_n$ are connected in parallel to a series circuit of capacitors $C_1$ to $C_n$ and FETs $Q_{c1}$ to $Q_{cn}$. When the power source voltage $V_{DD}$ is applied through FETs $Q_{RS1}$ to $Q_{RSn}$ to the transducers $PD_1$ to $PDn$ during reset, junction capacitors of the transducers $PD_1$ to $PD_n$ are charged. The charge is subsequently discharged in proportion to an amount of incident light rays. A diode $D_1$ connected to a transfer output terminal of the CCD transfer register 5 is an output diode of the floating diffusion type. Namely, the diode $D_1$ stores charge delivered by the transfer register 5 in a junction of the diode $D_1$ to convert it into a voltage. A gate of FET $Q_7$ in a monitor circuit which is constructed in a manner similar to the foregoing embodiments, is connected in common to gates of the FETs $Q_{c1\ to\ Qcn}$ and controlled in synchronism with a storage capacity switching signal CCG which is delivered from the CPU 9 (FIG. 2). A gate of FET $Q_6$ is connected in common to gates of the FETs $Q_{RS1}$ to $Q_{RSn}$ to be controlled by a reset signal RS from the CPU 9.

In the third embodiment, when an object being photographed is bright and a storage capacity switching signal CCG is at "H" and subsequently a pulse "H" as a reset signal RS is given to set an initial condition, the transducers $PD_1$ to $PD_n$ take storage capacitances of adding their junction capacitances to those of capacitors $C_1$ to $C_n$. In addition, a monitor photoelectric transducer $MPD_1$ takes a storage capacitance of adding its junction capacitance to that of a capacitor $C_M$. Since these storage capacitances are larger than those at a time when a storage capacity switching signal CCG is at "L", a time period for a monitor output MOS to reach the potential $V_{th}$ becomes longer, so that a condition adapted to a sufficiently bright object being photographed can be established.

When a monitor output MOS reaches the potential $V_{th}$, a transfer gate pulse $\phi T$ is delivered in synchronism with "H" of a transfer clock pulse $\phi 1$ to shift the stored charge in the transducers $PD_1$ to $PD_n$ and the capacitors $C_1$ to $C_n$ to the transfer line.

When the storage capacitance increases, an amount of charge to be stored increases. Under this condition, when all charges stored in the capacitors $C_1$ to $C_n$ are shifted to the CCD transfer line, charge in the transferred area overflows to lose linearity of a signal output MOS and to cause blooming, so called, as described above. Accordingly, when the storage capacitance increases, as in the second embodiment, a level of a transfer gate pulse $\phi T$ is lowered and a threshold potential of a signal transferred to the CCD transfer line is set to a high value to prevent the disadvantages such as blooming. When an object being photographed is brighter than a given level and a storage capacity switching signal CCG is switched from "L" to "H" in order to extend a charge storing period, an output $\phi T$ of an FET $Q_{14}$ in a transfer gate control circuit 18 of the CCD driver 7A (FIG. 8) is delivered as a pulse $\phi T3$ (FIG. 9) of a low voltage which is obtained by dividing the power source voltage $V_{DD}$ by resistors $R_3$ and $R_4$. Consequently, a threshold potential of a signal transferred to the CCD transfer line of the CCD transfer register 5 is set to a higher value than that at a time when the storage capacity switching signal CCG is at "L". As a result, even when a storage capacitance of signal charge in the photoelectric transducer varies, an amount of charge transferred to the transfer line is substantially equalized to eliminate the disadvantages such as blooming. In the foregoing embodiments, the storing period is controlled with a time period required for a storage potential of charge produced from the monitor photoelectric transducer $MPD_1$ which is disposed adjacent the photodiode array 1 to reach a given value. However, it is not necessarily limited to this, which will be described with reference to the following embodiment.

Figure 11:
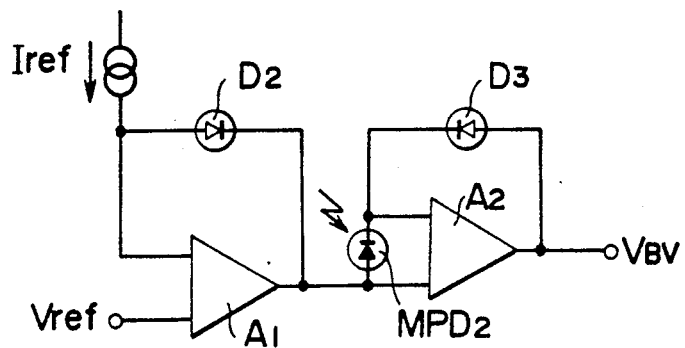
FIG. 11 is an electric circuit diagram of a brightness detector circuit for use in a fourth embodiment of the present invention.
Figure 12:
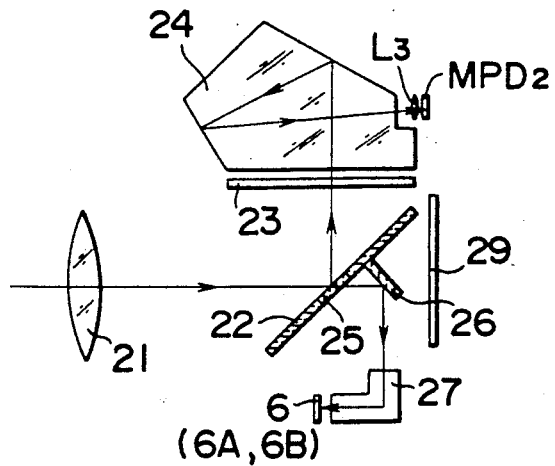
FIG. 12 is a structural diagram showing an optical system for focus detection in a camera to which the fourth embodiment is applied.

In FIGS. 11 and 12, which show a fourth embodiment of the present invention, only parts different from those of the foregoing embodiments are shown. In general, the smaller a light receiving area of a photoelectric transducer is, the smaller the photo current generated. Consequently, it is impossible to sufficiently detect a brightness of an object being photographed by a photocurrent in a monitor photoelectric transducer $MPD_2$ simply with a logarithmic compression circuit shown in FIG. 11, due to a delay in response particularly for a low brightness. As shown in FIG. 12, however, when a monitor photoelectric transducer $MPD_2$ is provided in a finder optical path, for example, which is separately provided from an optical path for focus detection, a photocurrent is increased to gain a response rate even in a low brightness, so that it is possible to use a logarithmic compression circuit as shown in FIG. 11. In FIG. 11, a reference voltage Vref is applied to one of the input terminals of an operational amplifier A, and a constant current Iref is supplied to the other input terminal. A diode $D_2$ is connected between input and output terminals of the amplifier $A_1$, to effect a current to voltage conversion. A monitor photoelectric transducer MPD₂ is connected across the input terminals of an operational amplifier A₂ and a diode D₃ is connected across the input and output terminals of the amplifier A₂.

In FIG. 12, which shows an optical system for focus detection for use in the fourth embodiment of the present invention, the same parts as those of the first embodiment shown in FIG. 1 are given the same reference characters and its description will be omitted. It will be understood that the CCD image sensors 6A, 6B described in the second and third embodiments can be used instead of the CCD image sensor 6. A lens L₃ is an image forming lens for equalizing a photometric zone of the monitor photoelectric transducer MPD₂ to a range measuring zone for Focus detection. Light rays passing through a finder optical path impinge upon the monitor photoelectric transducer MPD₂ through the lens L₃.

In operation, an output voltage of the amplifier A₁ is made a constant voltage by effecting a current to voltage conversion of a constant current Iref. A photocurrent of the transducer MPD₂ connected between the input terminals of the amplifier A₂ is logarithmically compressed by a logarithmic compression circuit comprising the amplifier A₂ and the diode D₃ to be delivered as a voltage $V_{BV}$. The voltage $V_{BV}$ is given by the following equation (1).

$$V_{BV} = V\text{ref} + \frac{kT}{q} \ln \frac{I_p}{I_{ref}} \qquad (1)$$

where Ip is a photocurrent of the transducer MPD₂ in FIG. 11, k is the Boltzmann constant, T is the absolute temperature and q is the charge of an electron.

From the equation (1), it is noted that an output voltage VBV is expressed by a voltage proportional to a logarithm of a brightness of an object being photographed. Accordingly, it is possible to change a charge storage capacitance of the photoelectric transducer by effecting an A/D conversion of the voltage, transferring it to the CPU 9 and comparing it with a predetermined value. As a result, with this embodiment, it is unnecessary to take steps of first making a series of measurements with a storage capacity switching signal CCG at "L" and of storing charge twice, when the charge storing period is smaller than a given period, as by measuring again with the signal CCG at "H", as in the foregoing embodiments, thus completing the measurement with only one operation.

In the foregoing embodiments, in order to maintain a level of a signal output OS of the CCD image sensor constant even when the charge storing period varies, a floating diffusion of an output of the CCD transfer register 5 is changed in the CCD image sensor 6 shown in FIG. 1 and a potential given to the transfer gate 4 is changed in the CCD image sensor 6A shown in FIG. 7. With such structures, it is possible to retain an input range of the A/D converter 8 connected to an output terminal of the CCD image sensor always constant at its maximum range and thus to increase accuracy. However it is not necessary to retain a signal output OS of the CCD image sensor constant and it is also possible to use the combination of the CCD image sensor 6A shown in FIG. 7 and the CCD driver 7 shown in FIG. 3. In this case, when light rays incident upon the photodiode array 1 are brighter than a given value, the capacitor CM is connected in parallel to the transducer MPD₁ by making the capacity switching signal CCG "H" to turn the FET Q₇ On, so that the charge storage period becomes longer than when the signal CCG is at "L", with the result that charge stored in the storage increases and a potential of a signal output OS of the CCD image sensor increases compared with the condition when the signal CCG is at "L". Consequently, in this case, since the signal output OS, that is, an input voltage of the A/D converter 8, varies in accordance with a brightness of light rays incident upon the photodiode array 1, there is a possibility of lowering somewhat the accuracy of the A/D conversion.

What is claimed is:

1. Photoelectric transducer apparatus comprising:
    photoelectric transducer means having a self-scanning image sensor composed of an array of photoelectric transducers of the charge storage type, being charged according to the intensity of light impinging thereon;
    charge storing period monitor means, including means for storing a charge, said monitor means detecting whether a charge storing period of said array of photoelectric transducers is less than a given period; and
    means for controlling said charge storing period by changing the capacitance of said charge storing monitor means in response to an output of said monitor means indicates that the charge storing period is less than said given period.

2. Photoelectric transducer apparatus according to claim 1 in which said monitor means charge storing means comprises a photoelectric monitor transducer disposed adjacent said photoelectric transducer array for detecting the charge storing period in response to an output of the photoelectric monitor transducer.

3. Photoelectric transducer apparatus according to claim 1, in which said monitor means comprises a photoelectric monitor transducer disposed within a finder optical system for detecting the charge storing period in response to an output of the photoelectric monitor transducer.

4. Photoelectric transducer apparatus according to claim 1 in which said charge storing period control means operates such that said charge storing period is extended in response to an output of said monitor means when said charge storing period is less than said given period.

5. Photoelectric transducer apparatus according to claim 1 in which said charge storing period control means comprises means for changing a capacity of a floating diffusion capacitor subjected to an output of said photoelectric transducer array.

6. A focus detector according to claim 1 in which said storage control means comprises means for changing a capacity of floating diffusion subjected to an output of said photoelectric transducer array.

7. A focus detector comprising:
    a self-scanning image sensor for receiving light beams from an object being photographed;
    drive means for driving said self-scanning image sensor;
    A/D conversion means for converting an output of said self-scanning image sensor;
    focus detection means for treating a digital signal from said A/D conversion means to detect an in-focus condition;
    monitor means for initially detecting a brightness of said object; and storage control means for controlling charge storage of said self-scanning image sensor by changing the capacitance of a charge storing capacitor of the monitor means in response to an output from said monitor means.

8. A focus detector according to claim 7 in which said monitor means has a photocurrent/logarithmic compressed voltage converting function.

9. A focus detector according to claim 7 in which said monitor means also includes means for detecting the completion of charge storing of said self-scanning image sensor.

10. A focus detector comprising:
photoelectric transducer means including a self-scanning image sensor composed of a photoelectric transducer array of the charge storage type;
drive means for driving said self-scanning image sensor;
A/D conversion means for converting an output from said photoelectric transducer means from analog to digital form;
focus detection means for treating a digital signal from said A/D conversion means to detect an infocus condition;
monitor means for sensing the brightness of an object;
means for operating said monitor means for monitoring brightness of the object during the charge storage of said photoelectric transducer array; and
switching means for switching a charge storing capacity of said photoelectric transducer means responsive to a predetermined signal of said monitor means.

11. A method for operating a photoelectric transducer apparatus employed for focus detection comprising photoelectric transducer means including a self-scanning image sensor comprising an array of photoelectric transducers for detecting a range to an object based on an output of the photoelectric transducer means and a charging element for monitoring, comprising the steps of:
initiating charging of said transducer array and said monitor charging element responsive to the brightness of said object, the charge developed by said monitor charging element being related to the brightness of the object;
comparing the charge provided by said monitor charging element against a first predetermined threshold upon initiation of accumulation of said charge and generating a compare signal when the charge accumulated reaches said predetermined threshold;
increasing the capacity of the charging element when the interval between initiation of the accumulation of said charge and generation of said compare signal is less than a predetermined length and maintaining the capacity of said charging element if said interval is greater than said predetermined length; and
comparing the charge accumulated by said monitor charging element against said first-mentioned threshold to terminate the charge storing period for said transducer array when the charge of said charging element reaches said first threshold.

12. The method of claim 11 wherein the charging capacity of said monitor charging element is increased by coupling another charging element in parallel therewith.

13. The method of claim 11 further comprising the steps of converting the charge accumulated by said transducer array to digital signals; and
utilizing said digital signals to detect an infocus condition.

14. A solid state pick-up device having a plurality of photoelectric transducers, charge storage means for storing a charge produced in each of said transducers and output means for delivering the charge in the charge storage means as a photoelectric transducer output in a time series, comprising:
monitor means including means for integrating a light flux incident upon said photoelectric transducers for monitoring an amount of the light flux;
control means for controlling the amount of charge stored in said charge storage means;
judging means for judging an excess of an output of said monitor means over a given value after accumulated during a predetermined time measured from the initiation of a storing operation by said control means to deliver a storing capacity changing signal; and
storing capacity changing means for changing the storing capacity of integration of said monitor means when said storing capacity change signal is delivered.

15. A solid state pick-up device having a plurality of photoelectric transducers, charge storage means for storing a charge produced in each of said transducers and output means for delivering the charge in the charge storage means as a photoelectric transducer output in a time series, comprising:
monitor means including means for integrating a light flux incident upon said photoelectric transducers for monitoring an amount of the light flux;
control means for controlling the amount of charge stored in said charge storage means;
judging means for judging an excess of an output of said monitor means over a given value accumulated during a predetermined time measured from the initiation of a storing operation by said control means to deliver a storing capacity changing signal; and
storing capacity changing means for changing the storing capacity of integration of said solid state pick-up device when said storing capacity change signal is delivered.

16. A solid state pick-up device according to claim 15, in which said solid state pick-up device includes a floating diffusion capacitor, said storing capacity change means changing the capacity of said floating diffusion capacitor which is provided in the output portion of said solid state pick-up device.

17. A solid state pick-up device according to claim 14 in which said storing capacity change means changes the storing capacity of said integrating means in said monitor means.

18. A focus state detection apparatus for a camera, comprising:
a solid state pick-up device for effecting integration at a predetermined speed according to an incident light intensity;
a focus detection optical system for forming an image of an object being photographed which varies in accordance with a focusing state of a taking lens on said pick-up device;
monitor means for monitoring a light flux incident upon said pick-up device;

control means for controlling the integration of said pick-up device, including initiation of the integration;

judging means for judging an excess of an output of said monitor means accumulated during a given time measured from the initiation of storing operation by said control means and delivering a storing capacity change signal when there is an excess;

storing capacity change means for changing a storing capacity for integration of said monitor means when said storing capacity change signal is delivered; and detecting means for detecting a focus state based on an output of said pick-up device.

19. A focus state detection apparatus for a camera, comprising:

a solid state pick-up device for effecting integration at a predetermined speed according to an incident light intensity;

a focus detection optical system for forming an image of an object being photographed which varies in accordance with a focusing state of taking lens on said pick-up device;

monitor means for monitoring a light flux incident upon said pick-up device;

control means for controlling the integration of said pick-up device, including initiation of the integration;

judging means for judging an excess of an output of said monitor means accumulated during a given time measured from the initiation of storing operation by said control means and delivering a storing capacity change signal when there is an excess;

storing capacity change means for changing a storing capacity for integration of said pick-up device when said storing capacity change signal is delivered; and detecting means for detecting a focus state based on an output of said pick-up device.

20. A focus detection apparatus according to claim 19, in which said solid state pick-up device includes a floating diffusion capacitor and said storing capacity change means changes the capacity of said floating diffusion capacitor which is provided in the output portion of the pick-up device.

21. A focus state detection apparatus according to claim 18, in which said storing capacity change means changes a storing capacity of said integration means in said monitor means.

22. A solid state pick-up device having a plurality of photoelectric transducers, a charge storage for storing a charge produced in each of the transducers and an output portion for delivering the charge in the charge storage as a photoelectric transducer output in a time series, comprising:

monitor means for monitoring a light flux incident upon said transducers;

control means for controlling a stored amount in said charge storage;

judging means for judging an excess of an output of said monitor means over a given value accumulated during a predetermined time measured from the initiation of storing operation by said control means to deliver a storing capacity change signal; and means for changing a capacity of a floating diffusion capacitor provided in said output portion.

23. A focus state detection apparatus for a camera, comprising:

a solid state pick-up device for effecting integration at a speed according to an incident light intensity;

a focus detection optical system for forming an image of an object being photographed which varies in accordance with a focusing state of taking lens on said pick-up device;

control means for controlling the integration, including initiation of the integration;

judging means for judging an excess of an output of said monitor means over a given value accumulated from the initiation of storing operation by said control means including means for comparing the accumulated output against a response threshold to generate an accumulation period and for determining whether said accumulation period is smaller than a predetermined value to deliver a judging signal;

means for compensating integration so as to change an integration time with said light flux in response to said judging signal; and detecting means for detecting a focus state based on an output of said pick-up device.

24. A focus state detection apparatus according to claim 23 in which said integration compensating means comprises means for changing an integration capacity of said monitor means.

25. A focus state detection apparatus according to claim 23 in which said integration compensating means comprises means for changing a capacity of a floating diffusion capacitor in said pick-up device.

* * * * *

UNITED STATES PATENT AND TRADEMARK OFFICE
CERTIFICATE OF CORRECTION

PATENT NO. : 5,028,948

DATED : July 2, 1991

INVENTOR(S) : Yamasaki

It is certified that error appears in the above-identified patent and that said Letters Patent is hereby corrected as shown below:

Column 1, line 38, "Sho60/1085-121,409" should be
--Sho60/1985-121,409--

Column 2, line 47, "senser" should be --sensor--

Column 2, line 55, "succesively" should be --successively--

Column 3, line 17, "registor" should be --register--

Column 5, line 17, "H" should be -- "L" --

Column 6, line 3, "($CFD_1 30 CFD_2$)" should be --($CFD_1 + CFD_2$)--

Column 6, line 24, "T" should be --$\Phi T$--

Column 6, line 26, "T" should be --$\Phi T$--

Column 13, line 23, before "taking" insert --a--

Signed and Sealed this

Sixteenth Day of February, 1993

*Attest:*

STEPHEN G. KUNIN

*Attesting Officer*  *Acting Commissioner of Patents and Trademarks*